United States Patent
Pihl et al.

(10) Patent No.: US 11,750,798 B2
(45) Date of Patent: Sep. 5, 2023

(54) IMAGE PROCESSING DEVICE AND A METHOD FOR ENCODING IMAGES CAPTURED BY A CAMERA

(71) Applicant: Axis AB, Lund (SE)

(72) Inventors: Fredrik Pihl, Lund (SE); Mattias Pettersson, Lund (SE)

(73) Assignee: AXIS AB, Lund (SE)

(*) Notice: Subject to any disclaimer, the term of this patent is extended or adjusted under 35 U.S.C. 154(b) by 64 days.

(21) Appl. No.: 17/495,839

(22) Filed: Oct. 7, 2021

(65) Prior Publication Data
US 2022/0116589 A1 Apr. 14, 2022

(30) Foreign Application Priority Data

Oct. 13, 2020 (EP) ..................... 20201594

(51) Int. Cl.
| | |
|---|---|
| H04N 19/105 | (2014.01) |
| H04N 19/146 | (2014.01) |
| H04N 19/159 | (2014.01) |
| H04N 19/176 | (2014.01) |
| H04N 23/68 | (2023.01) |

(52) U.S. Cl.
CPC ......... *H04N 19/105* (2014.11); *H04N 19/146* (2014.11); *H04N 19/159* (2014.11); *H04N 19/176* (2014.11); *H04N 23/6812* (2023.01)

(58) Field of Classification Search
None
See application file for complete search history.

(56) References Cited

U.S. PATENT DOCUMENTS

| | | | |
|---|---|---|---|
| 2008/0129839 A1 | 6/2008 | Asukai et al. | |
| 2014/0267615 A1* | 9/2014 | Tapia | H04N 13/204 348/46 |
| 2016/0205324 A1 | 7/2016 | Lammers | |
| 2017/0048438 A1 | 2/2017 | Ishikawa et al. | |
| 2020/0259984 A1* | 8/2020 | Weckel | H04N 23/68 |
| 2020/0267331 A1 | 8/2020 | Liu et al. | |

OTHER PUBLICATIONS

Schwarz et al., "Overview of the Scalable Video Coding Extension of the H.264/AVC Standard", IEEE Transactions on Circuits and Systems for Video Technology, vol. 17, No. 9, Sep. 1, 2007, pp. 1103-1120.

Chandrasekhar et al., "Motion-Adaptive Image Capture in a Body-Worn Wearable Sensor", IEEE, 2018, 4 pages.

* cited by examiner

*Primary Examiner* — Lindsay J Uhl
(74) *Attorney, Agent, or Firm* — XSENSUS LLP

(57) ABSTRACT

The present invention relates to the field of video encoding. In particular, it relates to a method 300 of encoding images captured by a camera and to an image processing device. An image sequence captured with an image sensor of the camera is obtained S310, and an oscillation frequency of a periodic movement of the camera during capturing of the image sequence is determined S320. A base subset of images of the image sequence corresponding to the oscillation frequency is identified S330 and the base subset of images are encoded S340 into an encoded video stream comprising intra frames and inter frames.

9 Claims, 3 Drawing Sheets

IMAGE PROCESSING DEVICE AND A METHOD FOR ENCODING IMAGES CAPTURED BY A CAMERA

CROSS-REFERENCE TO RELATED APPLICATION

This application claims priority from European Patent Application No. 20201594.7, filed on Oct. 13, 2020, the contents of which are incorporated by reference herein in its entirety.

TECHNICAL FIELD

The present invention relates to video encoding, and specifically to encoding video captured by a camera.

BACKGROUND

Cameras are used, e.g., by police officers, for capturing a video stream during patrols and incidents. Such cameras may also be referred to as body worn cameras, BWCs. The cameras are typically battery powered. Hence, there are limitations in power available for a camera. Furthermore, the cameras may be configured to transmit a captured video stream via a wireless connection. Hence, the bitrate available for such transmission is also a limiting factor in relation to encoding of the video stream.

SUMMARY OF THE INVENTION

An object of the present invention is to facilitate bitrate savings for a video stream generated by a camera.

According to a first aspect a method for encoding video captured by a camera is provided. The method comprises obtaining an image sequence captured with an image sensor of the camera, and determining an oscillation frequency of a periodic movement of the camera during capturing of the image sequence. The method further comprises identifying a base subset of images of the image sequence corresponding to the oscillation frequency, and encoding the base subset of images into an encoded video stream comprising intra frames and inter frames.

The inventors have realized that periodic movements of cameras having an oscillation frequency occur when in use and that such period movements can be beneficially taken into account in an encoding scheme enabling reduced bitrate with remained possibility to view and comprehend the content of the video. For such periodic movements, a subset of images (denoted the base subset of images in the present disclosure) can be identified (or selected) corresponding to the oscillation frequency, and encoded into an encoded video stream.

More movement between consecutive images in an image sequence to be encoded will generally result in a higher bitrate for the resulting encoded video stream than for a sequence of images with less movement between consecutive images, i.e. where consecutive images are more similar. The increased bitrate can for example be due to failure in motion estimate between consecutive images of the image sequence, wherein it is needed to perform intra encoding of image blocks instead of less costly inter encoding.

Furthermore, in an image sequence which has been captured by an image sensor of a camera whilst the camera moves periodically with an oscillation frequency, the periodic movement, i.e. a component of the movement of the camera that is recurring, results in a periodic movement in the image sequence which may be of less interest in relation to a video stream to be encoded. Typically, it is the scenes and objects and relations therebetween in the video stream that are of interest, e.g. forensic interest, rather than effects in the image sequence due to movements of the camera.

By identifying the base subset images which includes only a subset of the image sequence and encoding them into the video stream, the bitrate of the video stream may be reduced, even heavily reduced, in relation to encoding all of the image sequence using the same encoding principle.

Reducing the bitrate is beneficial, e.g., in that the bandwidth required for wirelessly transmitting the resulting video stream may be reduced and the storage space required for storing a resulting video stream is reduced. This becomes even more acute when a camera moves between different locations, e.g. due to a wearer of the camera moving, since the wireless capacity may vary between the different locations.

Identifying the base subset of images corresponding to the oscillation frequency enables a base subset of images consisting of images which are captured by the camera when it is in the same or similar position in relation to the periodic movement. This enables a base subset of images consisting of consecutive images which are similar, e.g. by having a similar orientation, and/or in which movement between consecutive images due to the periodic movement is reduced.

The method may further comprise identifying additional subsets of images of the image sequence, wherein each additional subset comprises images captured in-between two consecutive images of the base subset of images, and encoding the additional subsets of images. Each additional subsets of images may consist of all of or a subset of the images captured in-between two consecutive images of the base subset of images.

In addition to encoding the base subset of images into the video stream, it is beneficial to encode remaining or at least a subset of the remaining images (denoted the addition subsets of images in the present disclosure) of the image sequence into the encoded video stream, such that the encoded video stream includes the encoded base subset of images and the encoded additional subsets of images. This introduces a flexibility of enabling either a lower bitrate, e.g. by only transmitting the encoded base subset of images, or including more of the images of the image sequence in the encoded video stream, e.g. by transmitting both the encoded base subset of images and the encoded additional subsets of images.

The encoded base subset of images of the video stream comprises intra frames and inter frames which are independent from the additional subsets of images such that the encoded base subset of images of the video stream has been encoded and can be decoded independently from the additional subsets of images and any frames encoded from the additional subsets of images.

The base subset of images may be encoded as intra frames and inter frames using prediction dependent only on images within the base subset.

The additional subsets of images may be encoded as inter frames (P or B frames) using prediction dependent on a respective previous one of the two consecutive images of the base subset of images.

One or more images of the additional subsets of images may be encoded as empty frames. As used herein, by "empty frame" is generally meant a frame which has been encoded using skip blocks (P-skip blocks, empty blocks, etc.) for at least some of macroblocks (MB) of an encoded frame. In some embodiments, a majority of the MBs of the empty frame are encoded as skip blocks. In yet other embodiments, all MBs are set to/encoded as skip blocks. Moreover, an empty frame comprises a reference to another frame in the video stream. In other words, the empty frame is an inter encoded frame with at least one MB encoded as a skip block.

The method may further comprise estimating available bandwidth for transmission of the video stream to a remote unit. On condition that available bandwidth is lower than a threshold, transmitting only the encoded base subset of images of the encoded video stream to a remote unit; and on condition that the available bandwidth is equal to or higher than a threshold, transmitting both the encoded base subset of images and the encoded additional subsets of images of the encoded video stream to the remote unit.

Including only the encoded base subset of images of the encoded video stream in a transmission to a remote unit and, alternatively, including also the encoded additional subsets of images in the encoded video stream in the transmission to the remote unit enables adaptation of a bitrate of a video stream in relation to a varying bandwidth of a communication channel, such as a wireless communication channel, to a remote device to which the video stream is to be transmitted. The threshold for estimated available bandwidth over which both the encoded base subset of images and the encoded additional subsets of images of the encoded video stream is sent may be selected based on the bitrate of the encoded video stream including both the encoded base subset of images and the encoded additional subsets of images.

In the act of identifying the base subset of images, the base subset of images may consist of images captured at the oscillation frequency. For example, the images may be captured one image per period at the oscillation frequency.

By identifying the base subset of images such that it consists of images captured at the oscillation frequency, the base subset of images will consist of images captured at a same position in relation to the periodic movement of the camera. Hence, in the base subset of images movement between consecutive images due to the periodic movement is omitted or at least substantially reduced.

In the act of identifying the base subset of images, the base subset of images may be identified based further on a respective contrast or frequency content of the images of the image sequence. Periodic movements of the camera may result in variation of the contrast or frequency content of the images of the image sequence, which variation have the same or similar frequency as the oscillation frequency of the camera. Hence, by identifying e.g. a peak of the contrast or frequency content of the images of the image sequence, the base subset of images may be identified corresponding to the oscillation frequency of the camera. Furthermore, the base subset of images may also be identified such that it consists of images having a desired property in relation to contrast or frequency content.

The oscillation frequency may be determined using data from one or more motion sensors in the camera.

The oscillation frequency may be determined using data from the image sequence. Periodic movements of the camera may result in variation of properties of the images of the image sequence, which variation have the same or similar frequency as the oscillation frequency of the camera. Such variation of the properties of the images of the image sequence may result in a corresponding variation of data of the image sequence which can be used to identify the oscillation frequency of the camera.

The camera in which the image sequence has been captured may be a camera adapted to be worn on the body of a person. When a camera is worn on the body of the person and the person is moving, the camera will move together with the person. The movement will depend on the type of movement of the person and on the position on the body of the person the camera is worn. For example, when the person on which the camera is worn is walking or running, a periodic movement of the camera may result having an oscillation frequency. The camera may also be adapted to be worn on the body of an animal, such as a dog or a horse.

According to a second aspect, a non-transitory computer readable storage medium is provided. The non-transitory computer readable storage medium of the second aspect has stored thereon instructions for implementing the method according to the first aspect, when executed on a device having processing capabilities.

The above-mentioned features of the method according to the first and second aspect, when applicable, apply to the camera of the fourth aspect as well.

According to a third aspect, an image processing device is provided. The image processing device comprises circuitry configured to execute an image sequence obtaining function configured to obtain an image sequence captured with an image sensor of a camera. The circuitry is further configured to execute an oscillation frequency determining function configured to determine an oscillation frequency of a periodic movement of the camera during capturing of the image sequence. The circuitry is further configured to execute a base subset identifying function configured to identify a base subset of images of the image sequence corresponding to the oscillation frequency. The image processing device further comprises an encoder configured to encode the base subset of images into an encoded video stream comprising intra frames and inter frames.

The circuitry may be further configured to execute an additional subset identifying function configured to identify additional subsets of images of the image sequence, wherein each additional subset comprises images captured in-between two consecutive images of the base subset of images. The encoder may be further configured to encode the additional subsets of images into the encoded video stream.

The encoder may be further configured to encode the base subset of images as intra frames and inter frames using prediction dependent only on images within the base subset.

The encoder may be further configured to encode the additional subsets of images as one of inter frames using prediction dependent on a respective previous one of the two consecutive images of the base subset of images, and empty frames.

In the base subset identifying function, the base subset of images may consist of images captured at the oscillation frequency.

In the base subset identifying function, the base subset of images may be identified based further on a respective contrast or frequency content of the images of the image sequence.

The oscillation frequency determining function may be configured to determine the oscillation frequency using data from one or more motion sensors in the camera.

The oscillation frequency determining function may be configured to determining the oscillation frequency using data from the image sequence.

According to a fourth aspect, a camera comprising the image processing device of the third aspect is provided. The camera is preferably a surveillance camera or security camera.

The camera of the fourth aspect may comprise further circuitry configured to execute a bandwidth estimation function configured to estimate available bandwidth for transmission to a remote unit. The further circuitry may further be configured to execute a conditional transmission function configured to transmit only the encoded base subset of images of the encoded video stream to a remote unit on condition that available bandwidth is lower than a threshold; and transmitting both the encoded base subset of images and the encoded additional subsets of images of the encoded video stream to the remote unit on condition that the available bandwidth is equal to or higher than a threshold. The further circuitry of the camera of the fourth aspect may be separate from or the same as the circuitry of the image processing device of the third aspect.

The above-mentioned features of the method according to the first and second aspect, when applicable, apply to the camera of the fourth aspect as well.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein. Rather, these embodiments are provided for thoroughness and completeness, and to convey the scope of the invention to the skilled person.

Figure 1:
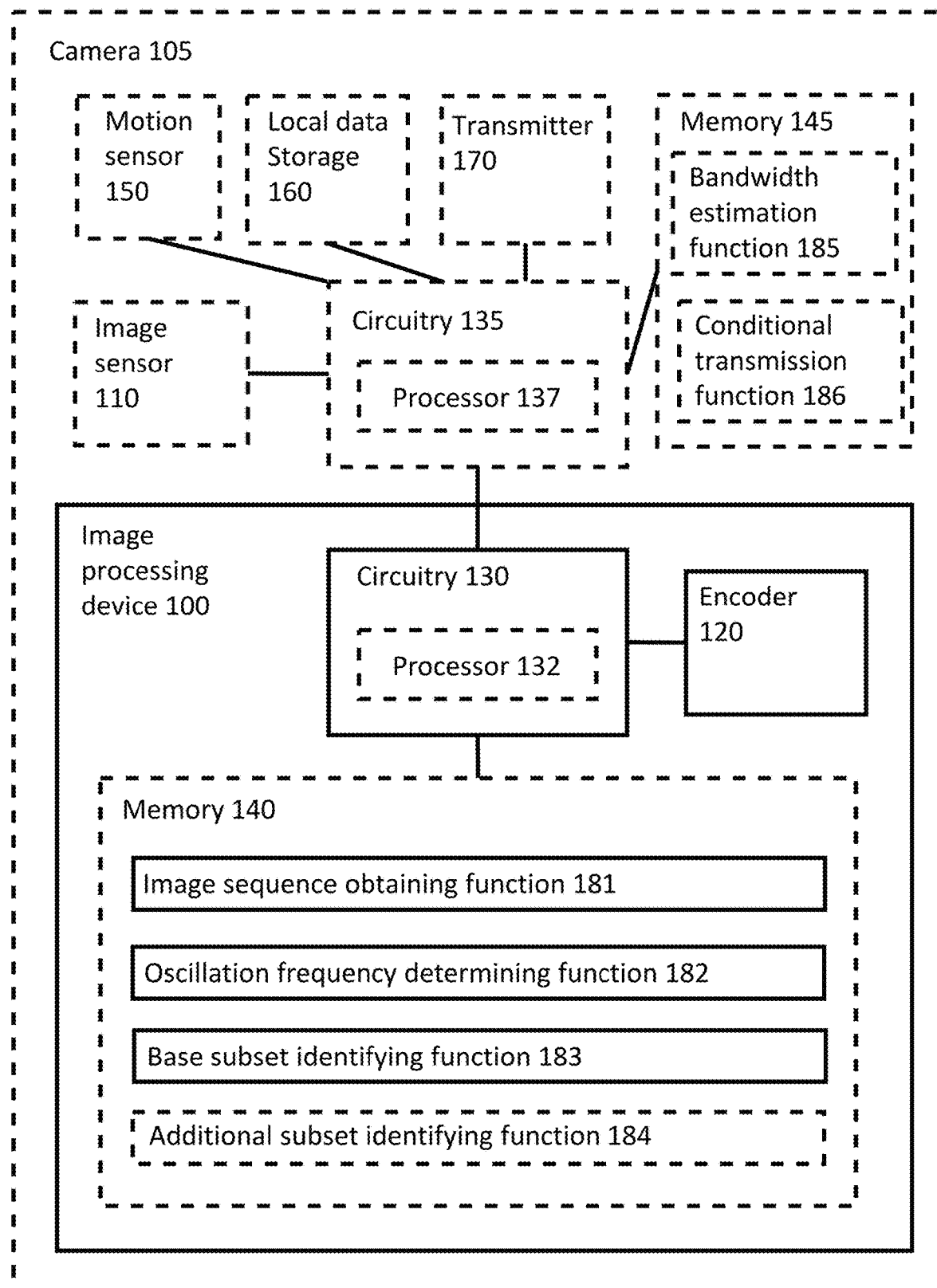
FIG. 1 is a schematic block diagram of an image processing device included in a camera.

FIG. 1 shows a schematic block diagram of an image processing device 100 as comprised in a camera 105. The camera 105 may any type of camera, such as a security camera or surveillance camera, for which periodic movement may occur. For example, the camera 105 may be a body worn camera, BWC, for which periodic movement of the camera for example may occur when a person or animal wearing the body worn camera walks or runs. The camera 105 may be used, e.g., by police officers, security guards, or police dogs, as a body worn camera for capturing video and other possibly other data during patrols and incidents. The camera 105 may also be used as a body worn camera on a person when that person rides a horse, bike, motorbike, car etc., and in such cases the camera 105 may also be worn by the horse, or mounted on bike, motorbike, car etc. Captured data (forensic information) may subsequently be needed as evidence, for example when investigating crimes and prosecuting suspected criminals. The camera 105 may also be a surveillance camera positioned such that periodic movements occur, such as for example on a pole which may start oscillating when exposed to wind or for some other reason. Another example where periodic movements may occur is a camera positioned on a boat being exposed to waves. In order to preserve the captured data, a data management system external from the camera 105, such as a video management system or an evidence management system, may be used. Such data management systems generally provide storage of captured data, and also viewing of the captured data, either in real time or as a playback of recorded data. The camera 105 and the image processing device 100 may be battery powered and typically subjected to bitrate limitations. The latter may be due to limited local data storage and/or limitations in bandwidth for a connection to a remote unit, such as the data management system or to a central where a live feed is viewed. The connection to the remote unit may be wireless. Furthermore, the limitation in bandwidth for the connection may vary over time and between different locations such that the bitrate that is possible to transmit occasionally becomes even more limited. The camera 105 comprises an image sensor 110 configured to capture image data. The image data may, e.g., be data of image frames. Image sensors and capturing of image data are well known for the person skilled in the art and will not be discussed in any more detail in this disclosure.

The image processing device 100 comprises an encoder 120 and circuitry 130.

The encoder 120 is configured to encode image data captured by the image sensor 110 into a video stream. Sometimes the video stream output by the encoder 120 is referred to as an encoded video stream. Typically, the video encoder 120 is configured to encode some of the image frames of the video stream as intra frames and some of the image frames of the video stream as inter frames. An intra frame is an encoded video frame that does not require information from other video frames to be decoded. Hence, an intra frame is encoded based on information from the image frame of video data it is set to correspond to. Typically, similarities within the image frame is used to encode the image frame into an intra frame. In video encoding an intra frame is often referred to as an I-frame. The image frames of the video stream in between two intra frames are encoded as inter frames. An inter frame is encoded based on information from at least one other image frame to be encoded than the image frame of video data the inter frame is set to correspond to. Inter frames typically comprise less data than intra frames. In video encoding an inter frame is often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame. When encoding an inter frame, an image frame is divided into multiple groups of pixels. The groups of pixels may for example be referred to as blocks, macroblocks, or coding tree units. The image frame is compared to a reference frame. For example, the reference frame for encoding a P-frame is a previous image frame. A matching algorithm is used to identify matching groups of pixels between the image frame to be encoded and the reference frame and if a match is found for a group of pixels, that group of pixels may be encoded based on a motion vector specifying how the group of pixels has moved in the image frame since the reference frame. Determining motion vectors is sometimes referred to motion estimation. If the movement is large due to fast movement of the camera 105, the motion estimation may fail in identifying motion vectors. The fewer motion vectors identified for an image frame to be encoded, the larger the resulting encoded inter frame will become in bit size and hence, the larger bandwidth will be required to transmit the encoded inter frame.

The circuitry 130 is configured to carry out functions of the image processing device 100. The circuitry 130 may include a processor 132, such as a central processing unit (CPU), microcontroller, or microprocessor. The processor 132 is configured to execute program code. The program code may for example be configured to carry out the functions of the image processing device 100.

The image processing device 100 may further comprise a memory 140. The memory 140 may be one or more of a buffer, a flash memory, a hard drive, a removable media, a volatile memory, a non-volatile memory, a random access memory (RAM), or another suitable device. In a typical arrangement, the memory 140 may include a non-volatile memory for long term data storage and a volatile memory that functions as system memory for the circuitry 130. The memory 140 may exchange data with the circuitry 130 over a data bus. Accompanying control lines and an address bus between the memory 140 and the circuitry 130 also may be present.

The camera may further comprise circuitry 135 configured to carry out functions of the camera 105. The circuitry 135 may include a processor 137, such as a central processing unit (CPU), microcontroller, or microprocessor. The processor 137 is configured to execute program code. The program code may for example be configured to carry out the functions of the camera 105.

In alternative to having separate circuitry 130, 135 including separate processors 132, 137 in the image processing device 100 and the camera 105 as illustrated in FIG. 1, a common circuitry including a common processor for the image processing device 100 and the camera 105 may be used.

The camera 105 may further comprise a motion sensor 150 for determining movement data for the camera. The motion sensor 150 is configured to measure movement data of the camera. The motion sensor 150 may comprise a gyroscope, an accelerometer, a pedometer, and/or any other sensor sensing motion. The gyroscope is configured to measure movement data in the form of orientation and/or angular velocity of the camera 105. The accelerometer is configured to measure movement data in the form of acceleration (or rate of change of velocity) of the camera 105 in its own instantaneous rest frame. The motion sensor 150 is configured to sample the movement data as a function of time.

The camera 105 may further comprise a local data storage 160. The local data storage 160 may be configured to store the video stream. The local data storage typically has a limited data storage capacity. The local data storage 160 may be any type of local data storage suitable for storage of a video stream. For example, the local data storage 160 may be in the form of an SD card reader and an SD card. Another example of a local data storage 160 may be in the form of a flash memory, e.g., a NAND flash.

The camera 105 may further comprise a transmitter 170. The transmitter 170 may be configured to transmit the video stream to the data management system, e.g., by means of a wireless connection. The transmitter 170 may be configured to continuously transfer a video stream to the video management system. The transfer is typically limited due to bandwidth available for the wireless transfer.

The camera 105 may further comprise a memory 145. The memory 145 may be one or more of a buffer, a flash memory, a hard drive, a removable media, a volatile memory, a non-volatile memory, a random access memory (RAM), or another suitable device. In a typical arrangement, the memory 145 may include a non-volatile memory for long term data storage and a volatile memory that functions as system memory for the circuitry 135. The memory 145 may exchange data with the circuitry 135 over a data bus. Accompanying control lines and an address bus between the memory 145 and the circuitry 135 also may be present.

In alternative to having separate memories 140, 145 in the image processing device and in the camera 105 as illustrated in FIG. 1, a common memory for the image processing device 100 and camera 105 may be used.

The functions of the image processing device 100 may be embodied in the form of executable logic routines (e.g., lines of code, software programs, etc.) that are stored on a non-transitory computer readable medium (e.g., the memory 140) of the image processing device 100 and are executed by the circuitry 130 (e.g., using the processor 132). Furthermore, the functions of the image processing device 100 may be a stand-alone software application or form a part of a software application that carries out additional tasks related to the image processing device 100. The described functions may be considered a method that a processing unit, e.g., the processor 132 of the circuitry 130, is configured to carry out. Also, while the described functions may be implemented in software, such functionality may as well be carried out via dedicated hardware or firmware, or some combination of hardware, firmware and/or software.

The circuitry 130 of the image processing device 100 is configured to execute an image sequence obtaining function 181. The image sequence obtaining function 181 is configured to obtain an image sequence captured with an image sensor of a camera, such as the image sensor 110 of the camera 105.

The image sequence obtained typically includes images captured during a number of periods of a periodic movement of the camera 105 comprising the image sensor 110 capturing the image sequence. By a periodic movement is meant a movement that is repeated regularly with a certain period. The periodic movement may be due to many reasons, such as the camera 105 being worn by a person or animal walking or running. Movement in the image sequence will thus include a component relating to the periodic movement and for some situations one or more other components relating to non-periodic movement.

For a case where the camera 105 is worn by a person or animal walking or running for example, the component relating to the periodic movement will be due to the wearer taking steps which results in the camera moving up and down and tilting to one side and then the other in a periodic movement. A component relating to non-periodic movement will be movement due to the wearer moving in the direction that the wearer walks or runs.

For a case where the camera 105 is a surveillance camera positioned such that periodic movement occurs, such as for example on a pole which may start oscillating when exposed to wind from the side such that the camera moves periodically from side to side.

Another example where periodic movement occurs is for a camera positioned on a boat being exposed to waves.

The periodic movement or the component of a total movement in the image sequence relating to the periodic movement is typically of less interest in relation to a video stream to be encoded. Typically, it is the content of the video stream, i.e. scenes and objects and relations therebetween, that is of interest rather than effects on the image sequence of movements of the camera. Furthermore, the periodic movement will generally contribute to increasing the bitrate of a resulting encoded video stream, e.g. due to failure in motion estimate between consecutive images of the image sequence.

Common to different types of periodic movement is that the camera will return periodically to the same or similar position and/or orientation such that images of the image sequence captured at a same relative position in the periodic movement will be similar.

The circuitry 130 is further configured to execute an oscillation frequency determining function 182. The oscillation frequency determining function 182 is configured to determine an oscillation frequency of the periodic movement of the camera 105 during capturing of the image sequence.

The oscillation frequency determining function 182 may be configured to determine the oscillation frequency using data from the motion sensor 150 in the camera 105. For example, if the camera 105 is worn by a user walking or running, the motion sensor 150 may include a pedometer which registers each time the user takes a step. Thus, the oscillation frequency may be determined by means of the registered steps. Other ways of identifying the oscillation frequency of the periodic movement using data from a motion sensor 150, e.g. including a gyroscope and/or an accelerometer, are well known for the person skilled in the art and will not be discussed in any more detail in this disclosure.

Alternatively or additionally, the oscillation frequency determining function 182 may be configured to determine the oscillation frequency using data from the image sequence or from the processing thereof. For example, due to the periodic movement of the camera 105, the bitrate of an encoded video stream may vary with the periodic movement such that the bitrate has the same oscillation frequency as the camera 105. This is due to bitrate spikes occurring at fast movements of the oscillating camera 105 where it is difficult for the encoded to perform motion estimations on the corresponding end position images. Fast movements could occur when the camera 105 is moving between end positions or if the camera 105 is rotating. Movement of the camera is mainly caused due to movement of the wearer, when he/she for example runs, walks, etc. A relatively large amount of intra encoding is thus required for the images captured during fast camera movements.

Thus, encoding the image sequence, a portion of the image sequence or even a preceding image sequence and analysing the bitrate of the encoded image sequence, encoded portion of the image sequence or encoded preceding image sequence, the oscillation frequency of the periodic movement of the camera 105 can be determined or at least estimated.

Generally, the periodic movement may be relatively (but not entirely) constant in oscillation frequency over time. For example, if the camera 105 is worn on a person or animal and the person or animal walks or runs, the oscillation frequency in the form of frequency of steps of the person or animal may vary somewhat over time but may be relatively constant over a number of consecutive periods, where one period is two steps; one with left foot and one with the right.

The oscillation frequency determining function 182 may be configured to determine the oscillation frequency as a mean over the image sequence, i.e. a number of identified periods of the periodic movement during the time for capturing of the image sequence divided by the time for the capturing of the image sequence.

The circuitry 130 is further configured to execute a base subset identifying function 183. The base subset identifying function 183 is configured to identify a base subset of images of the image sequence corresponding to the oscillation frequency.

An aim of the base subset identifying function 183 may be to identify the base subset of images such that it consists of images of the image sequence with a same or similar relative position in relation to the periodic movement such that the images of the base subset of images are similar, e.g. by having a similar orientation, and/or in which movement between consecutive images caused by the periodic movement is reduced. This is achieved by identifying the base subset of images corresponding to the oscillation frequency. Specifically, the base subset of images may be identified in the base subset identifying function 183 such that it consists of images captured at the oscillation frequency. This means that one image is identified in each period of the periodic movement with one period distance between consecutive images. Alternatives are possible, such as the base subset of images being identified in the base subset identifying function 183 such that it consists of images captured at half of the oscillation frequency. This means that one image is identified in every second period of the periodic movement with two periods distance between consecutive images. For some types of periodic movement, an alternative where the base subset of images is identified in the base subset identifying function 183 such that it consists of images captured at twice the oscillation frequency. This means that two images are identified in each period of the periodic movement with one half of a period distance between consecutive images. The latter is for example suitable for situations where the camera 105 passes a same position and/or orientation twice every period, such as a camera on a pole which oscillates sideways, e.g., due to being exposed to wind. The camera 105 will then pass a centre position twice every period on its way from each of the two extreme side positions in the periodic movement from side to side. There is no universal best base subset or universal best way of identifying a base subset. A suitable base subset will depend on the application and may also change over time. For example, suitable base subsets may be identified differently depending if the camera is a body worn camera or if it is a camera positioned on a pole.

Suitable base subsets may also be identified differently depending on where a body worn camera is positioned on the body of the person or animal wearing the camera and may be identified differently depending on whether the person or animal wearing the camera is walking or running. A skilled person will understand how to identify a suitable base subset, e.g. how to identify the base subset of images such that it consists of images of the image sequence with a same or similar relative position in relation to the periodic movement such that the images of the base subset of images are similar, e.g. by having a similar orientation, and/or in which movement between consecutive images caused by the periodic movement is reduced.

In addition to identifying the base subset corresponding to the oscillation frequency, e.g., one image per period, the base subset identifying function 183 may be configured to identify a desired position (timing) in each period for the images of the base subset of images. For example, the images of the image sequence may vary during each period in terms of contrast, frequency content, orientation or other quality measures, desired properties and resulting bitrate after encoding into the encoded video stream. For example, an image with the highest contrast may be identified in a period of the periodic movement and the base subset of images may be selected to consist of images of the image sequence identified at the oscillation frequency from the image with the highest contrast. The same can be done in respect of frequency content, orientation or other quality measures, desired properties and resulting bitrate after encoding into the encoded video stream.

In alternative or in addition to identifying the desired position (timing) in each period for the images of the base subset of images, the base subset identifying function 183 may be configured to identify an undesired position (timing) in each period for the images of the base subset of images. For example, the identifying may be based on evaluation of image properties that typically vary during each period. For example, the images of the image sequence may vary during each period such that at specific positions or regions of each period the image or images of the image sequence are undesirable to use in the base subset of images. For example, if a camera is worn by a person or animal who is walking or running, the image or images captured each time the user takes a step (is putting down her/his foot) is likely the most shaky/blurry and is advantageously avoided in the base subset of images. Such images may be identified by image analysis or indirectly by identifying by means of the motion sensor 150 when the user is taking a step. Identified undesired positions or regions may then be used as constraints when identifying a desired position.

Other criteria may be used to identify the desired position (timing) in each period for the images of the base subset of images, such as at an end position of the periodic movement. This would be at the upmost position and the lowermost position if the camera is moving up and downs such as when the camera is worn by a user walking or running. In alternative a centre position may be identified in-between the upmost and lowermost positions.

The encoder 120 is configured to encode the base subset of images into an encoded video stream comprising intra frames and inter frames. The encoder may further be configured to encode the base subset of images as intra frames and inter frames using prediction dependent only on images within the base subset. The encoder 120 may for example be adapted to encode according to H.264 or H.265 video compression standard.

The circuitry 130 may further be configured to execute an additional subset identifying function 184. The additional subset identifying function 184 may be configured to identify additional subsets of images of the image sequence, wherein each additional subset comprises images captured in-between two consecutive images of the base subset of images. The encoder 120 may then be further configured to encode the additional subsets of images to the encoded video stream including the encoded base subset of images and the encoded additional subsets of images.

The additional subsets of images comprise images that are not part of the base subset of images.

It is to be noted that the combination of the base subset of images and the additional subsets of images may together constitute all images of the image sequence or they may constitute a subset of all images of the image sequence. Hence, some images of the image sequence may not be encoded into the encoded video stream.

The encoder 120 may be configured to encode the additional subsets of images as inter frames using prediction with a first frame being dependent on a respective previous one of the two consecutive images of the base subset of images.

In alternative, the encoder 120 may encode the additional subsets of images as empty frames.

In alternative, the encoder 120 may encode some of the additional subsets as inter frames using prediction dependent on a respective previous one of the two consecutive images of the base subset of images and some of the additional subsets of images as empty frames.

The general concept of a base layer and one or more additional temporal layers is known from video compression standards. A novel aspect of the herein disclosed method is to identify a base subset of images such that it consists of images of the image sequence with a same or similar relative position in relation to the periodic movement such that the images of the base subset of images are similar, e.g. by having a similar orientation, and/or in which movement between consecutive images caused by the periodic movement is reduced.

Figure 2:
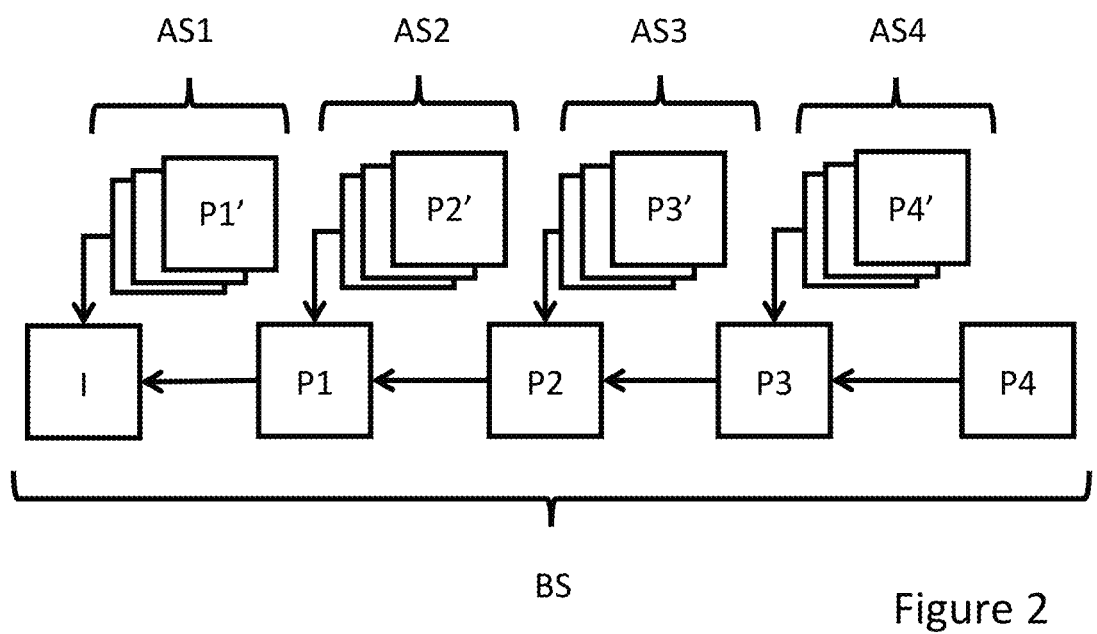
FIG. 2 is a schematic block diagram of a layered structure of an encoded video stream.

Turning to FIG. 2 which shows an encoding structure with layers in the form of a base layer including an encoded base subset of images BS and an additional layer including encoded additional subsets of images AS1-AS4. Such an encoding structure may be referred to as a temporal coding structure and is a type of hierarchical encoding structure. In relation to FIG. 2, a base subset of images corresponding to the oscillation frequency of a periodic movement of a camera has been identified such that it consists of one image per period of the periodic movement during five periods with a distance between consecutive images of the base subset of images equal to the length. The encoded base subset of images BS includes an intra frame I and four consecutive inter frames P1-P4. Additional subsets of images have been identified as all or some of the images of the images sequence between subsequent images of the base subset of images. The encoded additional subsets of images AS1-AS4 may for example have been encoded into inter frames P1'-P4' using prediction for an initial frame of each additional subset of images AS1-AS4 dependent on a respective previous one of the two consecutive images of the base subset of images. The inter frames P1' of the first encoded additional subset of images AS1 have been encoded using prediction dependent of the first image of the base subset of images, i.e. the image encoded into the intra frame I, and the inter frames P2' of the second encoded additional subset of images AS2 have been encoded using prediction dependent of the second image of the base subset of images, i.e. the image encoded into the first inter frame P1, etc. The time between intra frames in an encoded video stream should preferably not be too long. However, as the base layer includes only the encoded base subset of images which are, e.g., identified at the oscillation frequency which may correspond to steps taken by a user walking or running when wearing the camera, each image of the base subset of images may be separated by up to a second. Hence, the number of inter frames between consecutive intra frame in the base layer will become very few if the time between intra frames is too short. As a non-limiting example, a suitable number of frames between intra frames may be set to correspond to 5 seconds of encoded video. Depending on the frame rate of the video to be encoded, i.e. frames per second (FPS), the number of frames may vary. For a frame rate of 30 FPS, the number of frames between intra frames is 150 frames for a video period of 5 seconds. With this group of pictures (GOP) structure, several frames for the base layer may originate from a single GOP.

The images relating to the encoded base subset of images BS in the base layer are encoded independently from the images relating to the encoded additional subsets of images AS1-AS4 in the additional layer. The images relating to the images of the additional subsets of images AS1-AS4 of the additional layer on the other hand, are encoded with dependence of the images relating to the encoded base subset of images BS in the base layer. Hence, even if the two different layers are encoded into one video stream, when the encoded video stream is to be transmitted, selection can be made of two transmission modes. In a first transmission mode, only the base layer of the encoded video stream is transmitted, and in a second transmission mode both the base layer and the additional layer of the encoded video stream is transmitted. The first transmission mode will generally result in a substantially lower bitrate than the second transmission mode and may thus be used in a situation when the available bitrate for transmission is reduced.

In alternative to encoding the images of the additional subsets of images AS1-AS4 into inter frames P1'-P4' as illustrated in FIG. 2, the images of the additional subsets of images AS1-AS4 may be encoded into empty frames.

Additionally, in alternative to encoding the images of the additional subsets of images AS1-AS4 into P-frames using prediction dependent on a respective previous one of the two consecutive images of the base subset of images as illustrated in FIG. 2, the images of the additional subsets of images AS1-AS4 may be encoded into B-frames using prediction dependent on a respective latter one of the two consecutive images of the base subset of images.

Although in FIG. 2, two layers in the form of the base layer and the additional layer are illustrated, further layers may be added, such as for example adding a further additional layer such that there is a first additional layer and a second additional layer. In such a case, at least three alternative transmission modes for the encoded video stream associated with different bit rates may be used; a first transmission mode where only the base layer, i.e. the encoded images of the base subset of images, of the video stream is transmitted; a second transmission mode where the base layer and the first additional layer, i.e. the encoded images of the base subset of images and the encoded images of the first additional layer, of the video stream is transmitted; and a third transmission mode where the base layer, the first additional layer and the second additional layer, i.e. the encoded images of the base subset of images, the encoded images of the first additional layer, and the encoded images of the second additional layer, of the video stream are transmitted.

Reference is now made again to FIG. 1. The camera 105 may further comprise circuitry 135 configured to execute a bandwidth estimation function 185 configured to estimate available bandwidth for transmission to a remote unit, and a conditional transmission function 186. The conditional transmission function 186 is configured to transmit, via the transmitter 170, the encoded video stream using different transmission modes depending on a condition on the estimated available bandwidth.

On condition that available bandwidth is lower than a threshold, the conditional transmission function 186 is configured to use the first transmission mode where only the encoded base subset of images of the video stream to a remote unit (not shown) is transmitted, e.g. via wireless transmission. On condition that the available bandwidth is equal to or higher than a threshold, the conditional transmission function 186 is configured to use the second transmission mode where both the encoded base subset of images and the encoded additional subsets of images to the remote unit are transmitted.

The available bandwidth may be estimated in a conventional manner, e.g., based on feedback from the network, such as feedback indicating packet loss. The conditional transmission function 186 may be configured to transmit the encoded video stream using the second transmission mode until feedback is received indicating packet loss. This is an indication that the bandwidth is below the threshold. The conditional transmission function 186 may be configured to then use the first transmission mode where only the encoded base subset of images of the encoded video stream is transmitted. The conditional transmission function 186 may be configured to try (e.g. in regular intervals) to use the second transmission mode where both the encoded base subset of images and the encoded additional subsets of images are transmitted and monitor if any feedback is received indicating packet loss. If such feedback is received, the first transmission mode is used, if not the second transmission mode is used. Generally, at least the encoded base subset of images of the encoded video stream is always transmitted.

One scenario where wireless transmission of the encoded video stream is used in is a scenario where the encoded video stream is live-streamed for the purpose of live viewing by another user. In this scenario it is of extra importance that the other user is able to perceive the video content regardless of varying bandwidth capacity. It could for example be a scenario where a police officer is assisted by another police officer or an alarm operator. A body worn camera is worn by the police officer and a video stream from the body worn camera is wirelessly transmitted as a live-stream to the assisting police officer or alarm operator which remotely views the live-stream.

For situations where there is no periodic movement of the camera or when an oscillation frequency cannot be determined, the base subset of images may be identified on another basis than oscillation frequency. This basis may for example be the latest identified oscillation frequency or a predetermined default frequency or other. Such a basis is included to make sure that a lower bitrate encoded video stream comprising only the encoded base subset of images can always be transmitted if required, i.e. even when there is no periodic movement of the camera or when an oscillation frequency cannot be determined.

Figure 3:
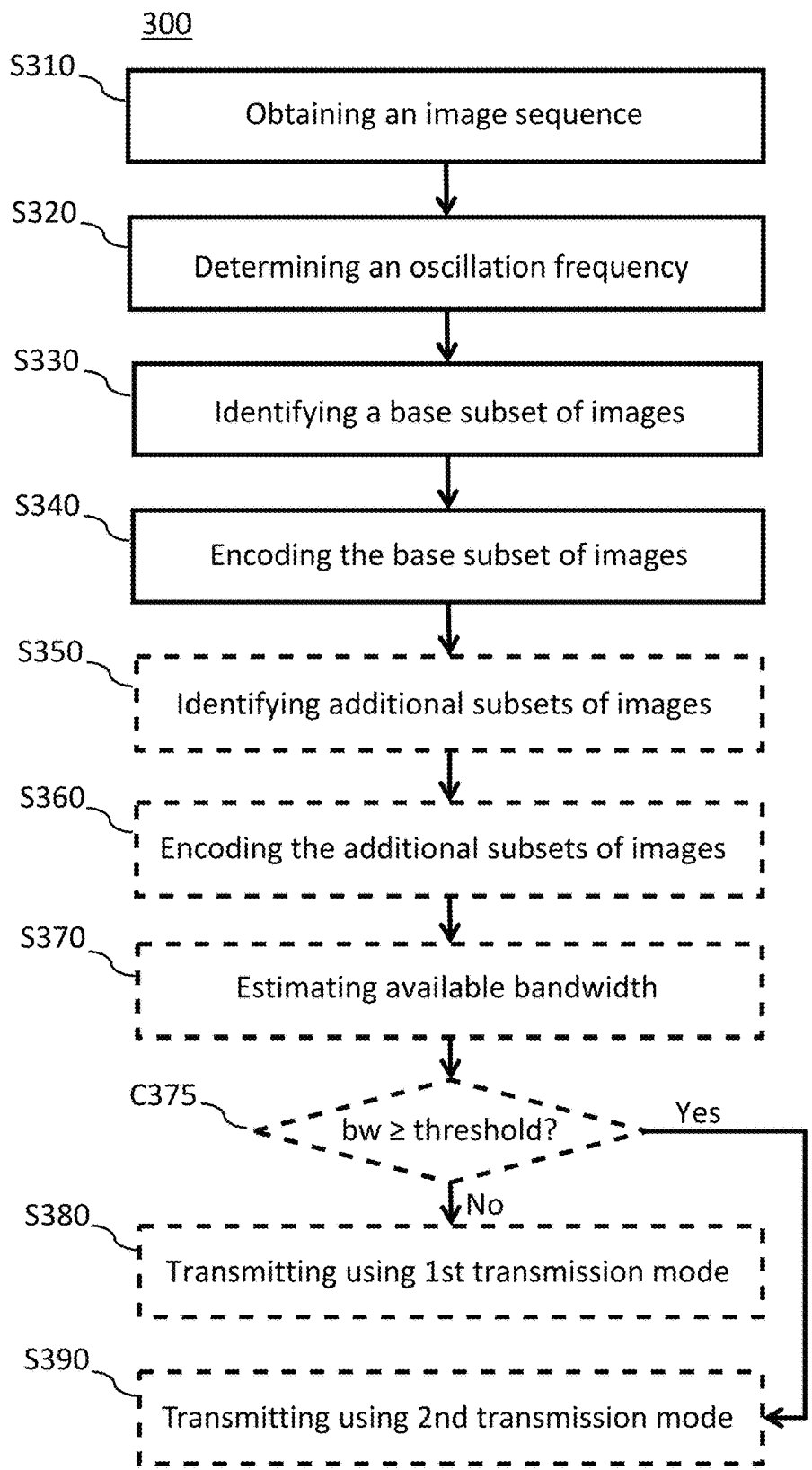
FIG. 3 is a flow chart of a method for encoding video captured by a camera.

In connection with FIG. 3, a method 300 for encoding video captured by a camera will be discussed. The method 300 makes use of a realization made by the inventor that for an image sequence captured by image sensor of a camera subjected to a periodic movement, an encoded video stream having a much reduced bitrate than may be achieved if an oscillation frequency of the periodic movement is determined, and a base subset of images of the image is identified corresponding to the oscillation frequency and encoded into the video stream instead of encoding all images of the image stream. This enables a base subset of images consisting of consecutive images which are similar, e.g. by having a similar orientation, and/or in which movement between consecutive images due to the periodic movement is reduced. Hence, the reduction of bitrate is not only due to the reduction of number of image frames but also due to the reduction of movement between consecutive images in the base image sequence as compared to between consecutive images in the image sequence. Furthermore, in an image sequence which has been captured by an image sensor of a camera whilst the camera moves periodically with an oscillation frequency, the periodic movement, i.e. a component of the movement of the camera that is recurring, results in a periodic movement in the image sequence which may be of less interest in relation to a video stream to be encoded. Typically, it is the scenes and objects and relations therebetween in the video stream that are of interest rather than effects on the image sequence of movements of the camera. By identifying the base subset of images of the image corresponding to the oscillation frequency, the base subset of images will have less movement between consecutive images than the movement between consecutive images of the image sequence. This is due to the reduction of the effect of the periodic movement on the base subset of images since the base subset of images is identified corresponding to the oscillation frequency of the periodic movement. Specifically, if the base subset of images consists of images of the image sequence captured at a same relative position in the periodic movement, i.e. at the oscillation frequency, each period (or every second period etc.), the images of the base image sequence, the effect of the component of the camera relating to the periodic movement on the movement between consecutive images of the base subset of images will be omitted or much reduced.

Some of all the steps of the method 300 may be performed by the functions of the image processing device 100 and/or the camera 105 described above. Unless a step specifically depends on the result of another step, the steps may be performed in any suitable order.

The method 300 comprises obtaining S310 an image sequence captured with an image sensor of the camera, and determining S320 an oscillation frequency of a periodic movement of the camera during capturing of the image sequence. The method further comprises identifying S330 a base subset of images of the image sequence corresponding to the oscillation frequency, and encoding S340 the base subset of images into an encoded video stream comprising intra frames and inter frames.

The base subset of images may be encoded as intra frames and inter frames using prediction dependent only on images within the base subset.

The method 300 may further comprise identifying S350 additional subsets of images of the image sequence, wherein each additional subset comprises images captured in-between two consecutive images of the base subset of images, and encoding S360 the additional subsets of images.

The additional subsets of images may be encoded as one of inter frames using prediction dependent on a respective previous one of the two consecutive images of the base subset of images, and empty frames.

The method 300 may further comprise estimating S370 available bandwidth for transmission of the encoded video stream to a remote unit. On condition C375 that available bandwidth is lower than a threshold, transmitting S380, using the first transmission mode, only the encoded base subset of images of the encoded video stream to a remote unit. On condition C375 that the available bandwidth is equal to or higher than a threshold, transmitting S390, using the second transmission mode, both the encoded base subset of images and the encoded additional subsets of images to the remote unit.

The step of estimating S370 available bandwidth may be performed in a conventional manner, e.g., based on feedback from the network, such as feedback indicating packet loss. The condition C375 may be configured to select transmitting S390 using the encoded video stream using the second transmission mode until feedback is received indicating packet loss. This is an indication that the bandwidth is below the threshold. The condition C375 may be configured to then select transmitting S380 using the first transmission mode where only the encoded base subset of images of the encoded video stream is transmitted. The condition C375 may be configured to then (e.g., in regular intervals) select transmitting S390 using the second transmission mode and monitor if any feedback is received indicating packet loss. If such feedback is received, the condition C375 is configured to select transmitting S380 using the first transmission mode, and if not select transmitting S390 using the second transmission mode.

In the step of identifying S330 the base subset of images, the base subset of images may be identified such that it consists of images captured at the oscillation frequency.

In the step of identifying S330 the base subset of images, the base subset of images may be identified based further on a respective contrast or frequency content of the images of the image sequence.

In the step of determining S320 the oscillation frequency, the oscillation frequency may be determined using data from one or more motion sensors in the camera.

In the step of determining S320 the oscillation frequency, the oscillation frequency may be determined using data from the image sequence.

As the oscillation frequency will typically vary over time, the step of determining S320 has to be performed repeatedly over time. For example, the step of determining S320 may be performed at a predetermined time interval, and after each time, the determined oscillation frequency is used. In alternative, the oscillation frequency is continually monitored. At a first time an oscillation frequency is determined 320. A base subset of images is then determined S330 based on the determined oscillation frequency up until the monitoring of the oscillation frequency indicates a change of the oscillation frequency by more than a certain percentage or absolute value from the determined oscillation frequency. Then a new oscillation frequency is determined 320 and a base subset of images is then determined based on the new determined oscillation frequency up until the monitoring of the oscillation frequency indicates a change of the oscillation frequency by more than a certain percentage or absolute value from the new determined oscillation frequency and so on.

The camera may be a camera adapted to be worn on the body of a person or an animal.

The method may further comprise corresponding features to features disclosed for the image processing device 100 and/or camera 105 described in relation to FIG. 1.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method of encoding images captured by a camera, the method comprising:
   obtaining an image sequence captured with an image sensor of the camera;
   determining an oscillation frequency of a periodic movement of the camera during capturing of the image sequence;
   identifying a base subset of images of the image sequence corresponding to the oscillation frequency such that the base subset of images consists of images captured when the camera is in the same or similar position in relation to the periodic movement;
   encoding the base subset of images into an encoded video stream comprising intra frames and inter frames,
   wherein the method further comprises:
      identifying additional subsets of images of the image sequence, wherein each additional subset comprises images captured in-between two consecutive images of the base subset of images;
      encoding the additional subsets of images into the encoded video stream;
   wherein the method further comprises:
      estimating available bandwidth for transmission of the encoded video stream to a remote unit;
      on condition that available bandwidth is lower than a threshold, transmitting only the encoded base subset of images of the encoded video stream to a remote unit; and
      on condition that the available bandwidth is equal to or higher than a threshold, transmitting both the encoded base subset of images and the encoded additional subsets of images of the encoded video stream to the remote unit.

2. The method of claim 1, wherein the act of encoding each additional subset of images comprises:
   encoding the additional subsets of images as one of:
   inter frames using prediction dependent on a respective previous one of the two consecutive images of the base subset of images, or
   empty frames, wherein an empty frame is a frame which has been encoded using skip blocks for at least some macroblocks of the frame.

3. The method of claim 1, wherein, in the act of identifying the base subset of images, the base subset of images consists of images captured at the oscillation frequency.

4. The method of claim 1, wherein the act of determining the oscillation frequency comprises:
   determining the oscillation frequency using data from one or more motion sensors in the camera.

5. The method of claim 1, wherein the act of determining the oscillation frequency comprises:
   determining the oscillation frequency using a variation of data from the image sequence or from the processing thereof corresponding to a variation of properties of the images of the image sequence, which variation has the same or similar frequency as the oscillation frequency of the periodic movement of the camera during capturing of the image sequence.

6. The method of claim 1, wherein the camera is a camera adapted to be worn on the body of a person.

7. A non-transitory computer readable storage medium having stored thereon instructions for implementing the method according to claim 1, when executed on a device having processing capabilities.

8. A camera comprising:
   an image sensor;
   a transmitter;
   an encoder; and
   an image processing device comprising circuitry configured to execute:
   an image sequence obtaining function configured to obtain an image sequence captured with the image sensor,
   an oscillation frequency determining function configured to determine an oscillation frequency of a periodic movement of the camera during capturing of the image sequence, and
   a base subset identifying function configured to identify a base subset of images of the image sequence corresponding to the oscillation frequency such that the base subset of images consists of images captured when the camera is in the same or similar position in relation to the periodic movement; and
   control the encoder to encode the base subset of images into an encoded video stream comprising intra frames and inter frames,
   wherein the circuitry is further configured to execute:
      an additional subset identifying function configured to identify additional subsets of images of the image sequence, wherein each additional subset comprises images captured in-between two consecutive images of the base subset of images, and
      control the encoder to encode the additional subsets of images into the encoded video stream,
   wherein the circuitry is further configured to execute:
      a bandwidth estimation function configured to estimate available bandwidth for transmission to a remote unit; and
      a conditional transmission function configured to:
         on condition that available bandwidth is lower than a threshold, control the transmitter to transmit only the encoded base subset of images of the encoded video stream to a remote unit; and
         on condition that the available bandwidth is equal to or higher than a threshold, control the transmitter to transmit both the encoded base subset of images and the encoded additional subsets of images to the remote unit.

9. The camera of claim 1, wherein the circuitry is configured control the encoder to encode the additional subsets of images as one of:
   inter frames using prediction dependent on a respective previous one of the two consecutive images of the base subset of images, or
   empty frames, wherein an empty frame is a frame which has been encoded using skip blocks for at least some macroblocks of the frame.

* * * * *